United States Patent
Ito et al.

(10) Patent No.: US 6,427,048 B2
(45) Date of Patent: *Jul. 30, 2002

(54) APPARATUS AND METHOD FOR RECORDING, REPRODUCING AND DISPLAYING A VIDEO SIGNAL RECEIVED BY A SIGNAL RECEIVER

(75) Inventors: Ryo Ito; Hitoshi Nakamura, both of Tokyo; Kosuke Yoshimura, Kanagawa; Naoki Okamoto, Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 83 days.

(21) Appl. No.: 09/065,547

(22) Filed: Apr. 24, 1998

(30) Foreign Application Priority Data

Apr. 28, 1997 (JP) .............................................. 9-110827
Apr. 28, 1997 (JP) .............................................. 9-110829

(51) Int. Cl.[7] .................................................. H04N 5/92
(52) U.S. Cl. ........................................ 386/95; 386/125
(58) Field of Search .............................. 386/46, 83, 95, 386/67, 68, 112, 125, 126, 120, 121; 358/906; H04N 5/92

(56) References Cited

U.S. PATENT DOCUMENTS

| | | | | |
|---|---|---|---|---|
| 4,963,992 A | * | 10/1990 | Doi et al. ...................... | 386/67 |
| 5,157,511 A | * | 10/1992 | Kawai et al. .................. | 386/68 |
| 5,335,116 A | * | 8/1994 | Onishi et al. .................. | 386/67 |
| 5,410,438 A | * | 4/1995 | Inoue ........................... | 386/67 |
| 5,546,191 A | * | 8/1996 | Hibi et al. ..................... | 386/83 |
| 5,576,950 A | * | 11/1996 | Tonomura et al. ........... | 386/121 |
| 5,966,496 A | * | 10/1999 | Takimoto ...................... | 386/95 |
| 5,974,218 A | * | 10/1999 | Nagasaka et al. ............. | 386/46 |

\* cited by examiner

*Primary Examiner*—Huy Nguyen

(57) ABSTRACT

A device for use in a television receiver for constantly recording a received program onto a recording medium such as a hard disk drive where a desired scene or program can be easily searched from recorded picture planes without an increase in circuit scale and costs. A picture plane area of a display is divided into a plurality of small picture plane areas and picture planes divided every predetermined time are displayed as index images in correspondence to the plurality of divided small picture plane areas respectively. When a desired one of the index images is designated, moving image information corresponding to the designated index image is read out from the hard disk drive and is displayed. An offset time of a predetermined amount is given to the index images which were divisionally displayed. The received video signal is compressed so that one field is set to a fixed length and is recorded onto the hard disk. A long time recording mode for the hard disk drive is set by varying a compression ratio or a subsampling interval for the video signal. Status information including information reflecting the long time recording mode is added to the compressed video signal and the resultant video signal is recorded on a block unit basis.

14 Claims, 9 Drawing Sheets

APPARATUS AND METHOD FOR RECORDING, REPRODUCING AND DISPLAYING A VIDEO SIGNAL RECEIVED BY A SIGNAL RECEIVER

BACKGROUND OF THE INVENTION

1. Field of the Invention

The present invention relates to a video recording apparatus and a reproducing apparatus which are suitable for use in a television receiver in which a program is always recorded to a recording medium and, more particularly, to a setting of a long time recording mode and a retrieval of a desired scene or program from recorded picture planes.

2. Description of the Related Art

It often happens that a telephone suddenly rings or a visitor suddenly comes while the user is enjoying a television broadcasting and he misses a broadcasting program. When a television broadcasting program is missed, except for a program which will be broadcasted again, the user can never watch again such a program. A program which will be broadcasted again in a short period is unusual. In most cases, news programs and sports programs are not broadcasted again. In many cases, therefore, when a television broadcasting program is missed, the program cannot be watched again.

There is also a case where a scene which is desired to be stored suddenly starts while a broadcasting program such as excellent scene of a movie or drama, interview with an important person, a highlight scene of a sports program, or the like is watched. In such a case, even if a VTR is immediately set, it often happens that the VTR cannot be ready to record such a scene and the scene cannot be recorded.

The inventors of the invention, therefore, have proposed a television receiver such that while the broadcasting program is watched, the program is always recorded to a recording medium. According to such a television receiver, even if a telephone suddenly rings or a visitor suddenly comes, the user can go back and reproduce the program, so that the program is not missed. Since the program can be easily stored, even if a program which is desired to be recorded suddenly starts, the television receiver can cope with such a situation.

The inventors of the invention have also proposed the use of a hard disk drive as a recording medium in the television receiver which always records a program to the recording medium as mentioned above. Hitherto, as a recording medium for recording a video signal, a magnetic tape is widely used. However, an accessing speed of the magnetic tape is slow and it is difficult to employ the magnetic tape as a recording medium which is used in the television receiver. Although the use of a semiconductor memory is considered, the semiconductor memory of a large capacity is very expensive and is not suitable for a case where a program is stored for a long time since the stored program is erased when the power source is turned off. On the contrary, the hard disk drive has a large capacity and a sufficiently high accessing speed.

When the video signal is recorded to the hard disk drive as mentioned above, it is further desirable that the long time recording can be performed in accordance with an application. In case of recording the video signal to a tape, by changing a feeding speed of the tape, the long time recording can be realized. For example, the long time recording mode is called a triple time mode in the VHS system and is called an LP mode in an 8 mm VTR. In those modes, by changing the feeding speed of the tape, the long time recording mode is set.

In case of recording the video signal to the hard disk drive as well, it is desired that the long time recording mode can be set in a manner similar to the triple time mode of the VHS system and the LP mode of the 8 mm VTR.

When the video signal is recorded into the hard disk drive, however, the long time mode cannot be realized by a method similar to that in the case where the video signal is recorded to the tape.

In the conventional VTR, since the long time recording mode is set by changing the feeding speed of the tape, there is a problem such that a reproduction picture plane is disturbed by a switching of the recording mode.

It is, therefore, an object of the invention to provide a video recording apparatus and a reproducing apparatus which can easily set a long time recording mode when a video signal is recorded to a recording medium such as a hard disk or the like.

When the recording time of a program is long, it is difficult for the user to search a desired scene. For example, when the video signal is compressed by the motion JPEG and recorded by using a hard disk drive of a capacity of about 1 Gbytes, a recording time of about 60 minutes can be assured. It is, however, not easy to search a desired scene from recording picture planes of the long time and reproduce it.

A method of preliminarily recording images distinguished as index images and searching by reading out the index images in accordance with a predetermined procedure, a method of detecting a scene change and searching by using the detected image at the time of the scene change as an index image, a method of simply dividing a recording time every predetermined time and using a representative image of each time zone as an index, and the like are considered.

According to the method of preliminarily recording the images distinguished as index images and searching by reading out the index images by the determined procedure, it is necessary to record the determined index images. The method cannot be applied to a case of searching the contents of the recorded received picture plane. According to the method of detecting the scene change in the reproduction picture plane and using the position where the scene is changed as an index, a correlation detecting circuit or a motion detecting circuit for detecting the scene change is necessary, so that a circuit scale is increased and the costs are increased. In the method of simply dividing the recording time every predetermined time and using a representative image of each time zone as an index, since the image is not always a significant image in which the position of the search image can be identified, an efficient search cannot be performed.

As mentioned above, when the received picture plane is recorded to the hard disk drive, since the video data has been compressed and recorded, it is difficult to form index images by simply dividing the recording time every predetermined time.

That is, when the received picture plane is recorded to the hard disk drive apparatus as mentioned above, video data is compressed in order to improve the recording time. As a video data compression processing method, an MPEG (Motion Picture Experts Group) system and a motion JPEG (Joint Photographics Coding Experts Group) system are known. Although a compression efficiency of the MPEG system is high, since the compression in the time base direction is performed, it is difficult to search or reproduce the data at variable speeds on a field unit basis. When the received picture plane is recorded in the hard disk, it can be considered to compress the video data by the motion JPEG system.

In the motion JPEG system, however, a compression ratio of the picture plane is different in dependence on a pattern or the like. Consequently, when the video data is compressed by the motion JPEG and is recorded into the hard disk drive, a correspondence between the address in the hard disk drive and a recording time cannot be obtained. The recording time cannot be, therefore, simply obtained from the addresses of the hard disk drive and it is difficult to divide the recording time every predetermined time and display.

It is, therefore, another object of the invention to provide a video recording apparatus, a video reproducing apparatus, and a recording and reproducing method of the apparatuses, in which a desired scene or program can be easily searched from recorded picture planes without causing an increase in circuit scale and costs.

SUMMARY OF THE INVENTION

According to the invention, there is provided a video apparatus comprising: a recording medium on which moving image information is recorded; time-divisional means for dividing the moving image information recorded on the recording medium every predetermined time; display means for displaying the moving image information; picture plane division display means for dividing a picture plane area of the display means into a plurality of small picture plane areas and displaying the moving image information of every predetermined time divided by the time-divisional means as an index image in correspondence to each of the plurality of divided small picture plane areas; and input means for designating a desired one of the index images which are displayed in the plurality of small picture plane areas, wherein when the index image is designated by the input means, the moving image information corresponding to the designated index image is read out from the recording medium and is displayed by the display means.

According to the invention, the video apparatus further comprises offset means for giving an offset time of a predetermined amount to the moving image information of every predetermined time divided by the time-divisional means.

According to the invention, there is provided a display method of a video apparatus, comprising the steps of: dividing moving image information recorded on a recording medium every predetermined time; dividing a picture plane area to display the moving image information into a plurality of small picture plane areas and displaying the moving image information divided every predetermined times as an index image in correspondence to each of the plurality of divided small picture plane areas; designating a desired one of the index images which are displayed in the plurality of small picture plane areas; and when the index image is designated, reading out the moving image information corresponding to the designated index image from the recording medium and displaying.

According to the invention, the display method further includes a step of giving an offset time of a predetermined amount to the moving image information of every predetermined time.

When an overview search key is depressed, the display picture plane is divided into a plurality of small picture planes and an image of video data of every predetermined time recorded in a hard disk drive is divisionally displayed in each divided picture plane. When the overview search key is further pressed, the time of each picture plane is offset every predetermined time. Therefore, a desired reproduction start position can be easily retrieved from the index picture planes.

According to the invention, there is provided a video apparatus comprising: video compressing means which compresses a video signal of a predetermined unit so as to have a fixed length and whose compression ratio can be changed; input means to which mode set inputs to set a standard recording mode and a long time recording mode are given; compression ratio setting means for varying the compression ratio of the video compressing means in accordance with a mode set inputs from the input means; and recording means for forming blocks obtained by adding status information including information of the recording mode to the compressed video signal and recording the video signal and the status information onto a recording medium on a block unit basis.

According to the invention, there is provided a video apparatus for reproducing a video signal and status information from a recording medium on a unit basis of a block obtained by adding the status information including information of a long time recording mode to a compressed video signal, comprising: means for detecting the status information from the block, discriminating whether the recording mode is a standard recording mode or the long time recording mode, and setting a compression ratio in accordance with the standard recording mode or the long time recording mode; and video decompressing means for decompressing the video signal reproduced from the recording medium on the basis of the compression ratio.

According to the invention, there is provided a video apparatus comprising: decimating means which decimates a video signal of a predetermined unit at every predetermined interval and whose decimating interval can be changed; input means to which mode set inputs to set a standard recording mode and a long time recording mode are given; decimation changing means for varying the decimating interval in accordance with the mode set inputs from the input means; and recording means for forming blocks obtained by adding status information including information of the recording mode to the video signal and recording the video signal and the status information onto a recording medium on a block unit basis.

According to the invention, there is provided a video apparatus for reproducing a video signal and status information from a recording medium on a unit basis of a block obtained by adding the status information including information of a long time recording mode to the video signal, comprising: video interpolating means for detecting the status information from the block, discriminating whether the recording mode is a standard recording mode or the long time recording mode, and interpolating the video signal reproduced from the recording medium in accordance with the standard recording mode or the long time recording mode.

When the video signal is compressed and recorded onto the recording medium, by changing the compression ratio, the long time recording mode can be easily set. By dividing the video signal into the blocks of a fixed length and providing a header including information regarding the recording mode into the blocks, the recording and reproducing processes can be processed in a manner similar to the ordinary recording mode and the compression ratio can be easily set to a compression ratio according to the recording mode upon reproduction.

When the video signal is recorded onto the recording medium, by changing a subsampling interval, the long time recording mode can be easily set. By dividing the video signal into the blocks of a fixed length and providing a header including the information regarding the recording mode into the blocks, the recording and reproducing processes can be executed in a manner similar to those in the ordinary recording mode, and the interpolating process according to the recording mode can be easily performed upon reproduction.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be described hereinbelow with reference to the drawings. The invention is applied to a television receiver having a hard disk drive therein. In such a television receiver with the hard disk drive, a missed scene or a scene which the viewer wants to again see can be seen while going back or a desired program can be recorded or reproduced.

Figure 1:
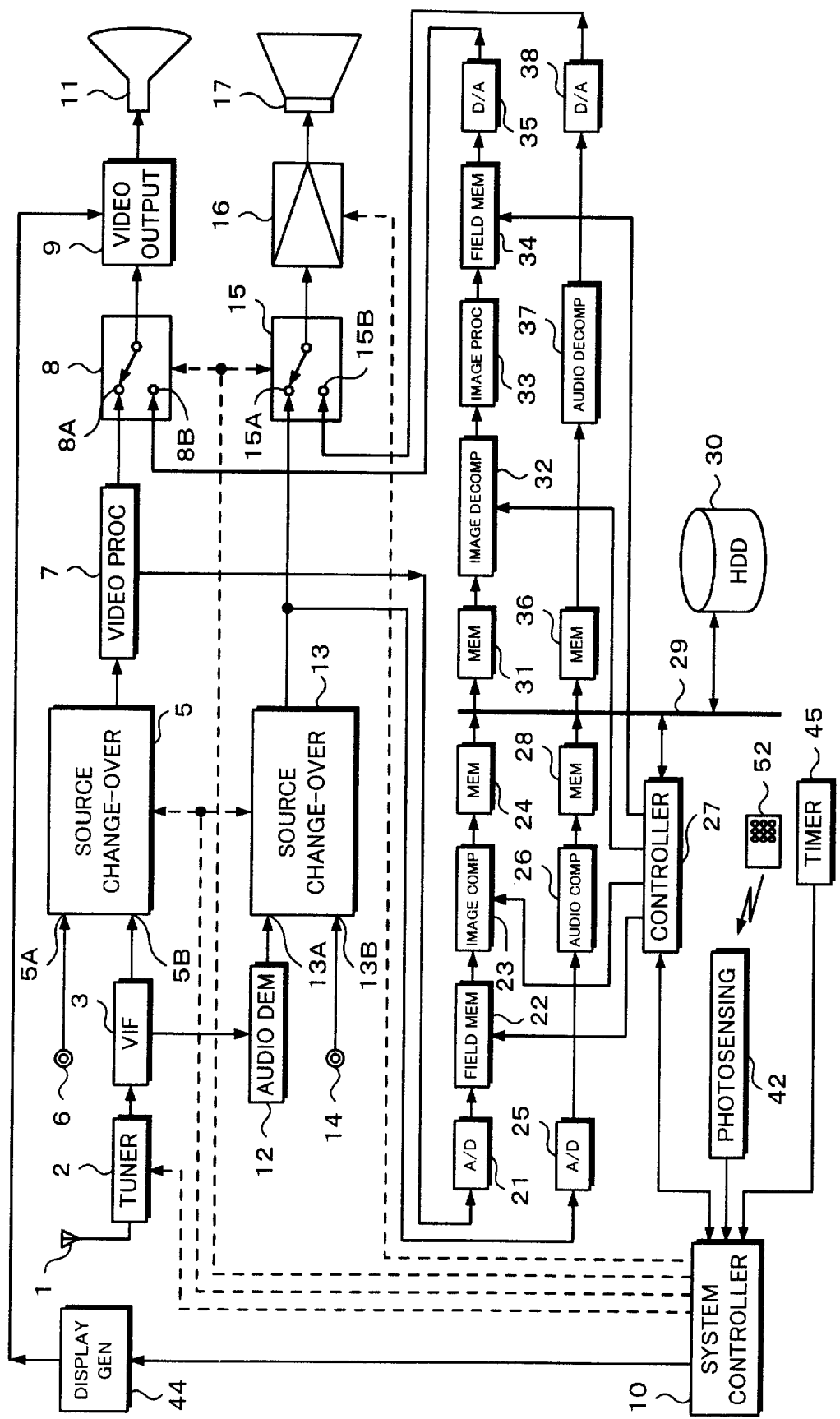
FIG. 1 is a block diagram of an example of a television receiver to which the invention is applied.

FIG. 1 shows a construction of a television receiver to which the invention is applied. In FIG. 1, a reception signal received by an antenna 1 is supplied to a tuner circuit 2. A channel set signal is supplied from a system controller 10 to the tuner circuit 2. On the basis of the channel set signal, a signal of a desired reception channel is selected in the tuner circuit 2 and this signal is converted into an intermediate frequency signal.

An output of the tuner circuit 2 is supplied to a video intermediate frequency circuit 3. In the video intermediate frequency circuit 3, an intermediate frequency signal from the tuner circuit 2 is amplified and the amplified signal is video detected. Thus, a composite video signal of, for example, the NTSC system is derived. The video signal is supplied to one input terminal 5A of a video source change-over switch 5. An audio signal is detected from a beat component of, for example, 4.5 MHz in an output of the intermediate frequency circuit 3. This output is supplied to an audio demodulating circuit 12.

A video signal from an external video input terminal 6 is supplied to another input terminal 5B of the video source change-over switch 5. A selection signal is supplied from the system controller 10 to the video source change-over switch 5. The video signal based on a received television broadcasting and the video signal from the external video input terminal 6 are switched by the video source change-over switch 5.

An output of the video source change-over switch 5 is supplied to a video signal processing circuit 7. A luminance signal Y and a chroma signal C are separated from the composite video signal of the NTSC system by the video signal processing circuit 7. Further, color difference signals U and V are demodulated from the chroma signal C and component video signals Y, U, and V are formed. The component video signals Y, U, and V are supplied to a terminal 8A of a switching circuit 8 and are supplied to an A/D converter 21 in order to preserve the video signal into a hard disk drive 30. An output of a D/A converter 35 is supplied to another input terminal 8B of the switching circuit 8 in order to output a reproduction picture plane from the hard disk drive 30.

The switching circuit 8 is used to switch a picture plane based on the received television broadcasting or the video signal from the external video input terminal 6 and a reproduction picture plane from the hard disk drive 30. The switching circuit 8 is controlled by the system controller 10. In case of displaying the picture plane based on the received television broadcasting or the video signal from the external video input terminal 6, the switching circuit 8 is switched to the terminal 8A side. In case of displaying the reproduction picture plane from the hard disk drive 30, the switching circuit 8 is switched to the terminal 8B side.

An output of the switching circuit 8 is supplied to a video output circuit 9. The video output circuit 9 comprises: a matrix circuit for forming three primary color signals R, G, and B from the component video signals Y, U, and V from the switching circuit 8; and a video amplifying circuit for driving the three primary color signals R, G, and B and supplying to a color image receiving tube 11. In the video output circuit 9, the component video signals Y, U, and V from the switching circuit 8 are converted into the three primary color signals R, G, and B and supplied to the color image receiving tube 11.

The audio signal detected from the beat component of, for example, 4.5 MHz in the output of the intermediate frequency circuit 3 is supplied to the audio demodulating circuit 12. The audio signal is demodulated in the audio demodulating circuit 12. The audio signal is supplied to an input terminal 13A of an audio source change-over switch 13.

An audio signal from an external audio input terminal 14 is supplied to another input terminal 13B of the audio source change-over switch 13. Either one of an audio signal based on the received television broadcasting and the audio signal from the external audio input terminal 14 is selected by the audio source change-over switch 13.

An output of the audio source change-over switch 13 is supplied to a terminal 15A of a switching circuit 15 and is supplied to an A/D converter 25 in order to preserve the audio signal to the hard disk drive 30. An output of a D/A converter 38 is supplied to another input terminal 15B of the switching circuit 15 in order to output the audio signal from the hard disk drive 30.

The switching circuit 15 is used to switch the audio signal from the received television broadcasting or from the external audio input terminal 14 and the audio signal reproduced from the hard disk drive 30. The switching circuit 15 is controlled by the system controller 10. In case of outputting the audio signal from the received television broadcasting or the external audio input terminal 14, the switching circuit 15 is switched to the terminal 15A side. In case of outputting the audio signal from the hard disk drive 30, the switching circuit 15 is switched to the terminal 15B side.

An output of the switching circuit 15 is supplied to an audio amplifier 16. The audio signal from the switching circuit 15 is amplified by the audio amplifier 16. This audio signal is supplied to a speaker 17.

The component video signals Y, U, and V from the video signal processing circuit 7 are supplied to the A/D converter 21 in order to preserve in the hard disk drive 30. In the A/D converter 21, the component video signals from the video signal processing circuit 7 are converted into digital signals. An output of the field memory 22 is supplied to a field memory 22. An output of the A/D converter 21 is supplied to an image compressing circuit 23. In the image compressing circuit 23, the component video signals are compressed. As a compressing system of an image, for example, a motion JPEG is used and the signal is compressed so that a code amount of one field is equalized. The video data compressed by the image compressing circuit 23 is transmitted to a bus 29 through a buffer memory 24.

The audio signal from the audio source change-over switch 13 is supplied to the A/D converter 25 in order to preserve in the hard disk drive 30. In the A/D converter 25, the audio signal from the audio source change-over switch 13 is converted to the digital signal. An output of the A/D converter 25 is supplied to an audio compressing circuit 26. The audio signal is compressed in the audio compressing circuit 26. For example, a non-linear PCM is used as a compressing system of audio. The audio data compressed by the audio compressing circuit 26 is transmitted to the bus 29 through a buffer memory 28.

The video data from the buffer memory 24 and the audio data from the audio compressing circuit 26 are synthesized to blocks of a fixed length. A predetermined header to identify the block is provided in each block. As will be explained hereinlater, information such as compression information, decimation information, and the like to identify the recording mode is included in the header in addition to information of wide/normal, stereo/monaural, recording date, and the like.

As mentioned above, the video data and audio data which were synthesized to the blocks are recorded to the hard disk drive 30 through the bus 29 under the control of a recording/reproduction controller 27 comprising a CPU (Central Processing Unit). Thus, the video data and audio data are stored into the hard disk drive 30.

The video data and audio data recorded in the hard disk drive 30 are reproduced under the control of the recording/reproduction controller 27. The reproduction data from the hard disk drive 30 is supplied to buffer memories 31 and 36 through the bus 29, respectively.

The video data from the buffer memory 31 is supplied to an image decompressing circuit 32. The component video data Y, U, and V are formed from the video data compressed by, for example, the motion JPEG by the image decompressing circuit 32. An output of the image decompressing circuit 32 is supplied to the D/A converter 35 through an image processing circuit 33 to form a multiscreen and a field memory 34. The digital video signal is converted into the analog video signal by the D/A converter 35. An output of the D/A converter 35 is supplied to the terminal 8B of the switching circuit 8.

The audio data from the buffer memory 36 is supplied to an audio decompressing circuit 37. An output of the audio decompressing circuit 37 is supplied to the D/A converter 38. The digital audio signal is converted into the analog audio signal by the D/A converter 38. An output of the D/A converter 38 is supplied to the terminal 15B of the switching circuit 15.

The system controller 10 controls the whole television receiver. The system controller 10 and recording/reproduction processing controller 27 are bidirectionally connected.

An input is supplied from a remote commander 52 to the system controller 10 through a photosensing unit 42. Various operations are set on the basis of an input from the remote commander 52. The output of the system controller 10 is supplied to a display generating circuit 44. A display signal showing various operation setting states is generated from the display generating circuit 44. An output of the display generating circuit 44 is supplied to the video output circuit 9 and the various operating states are displayed on the screen. A timer 45 is provided for the system controller 10. The timer 45 is used to set a time which is required to preserve a program.

Figure 2:
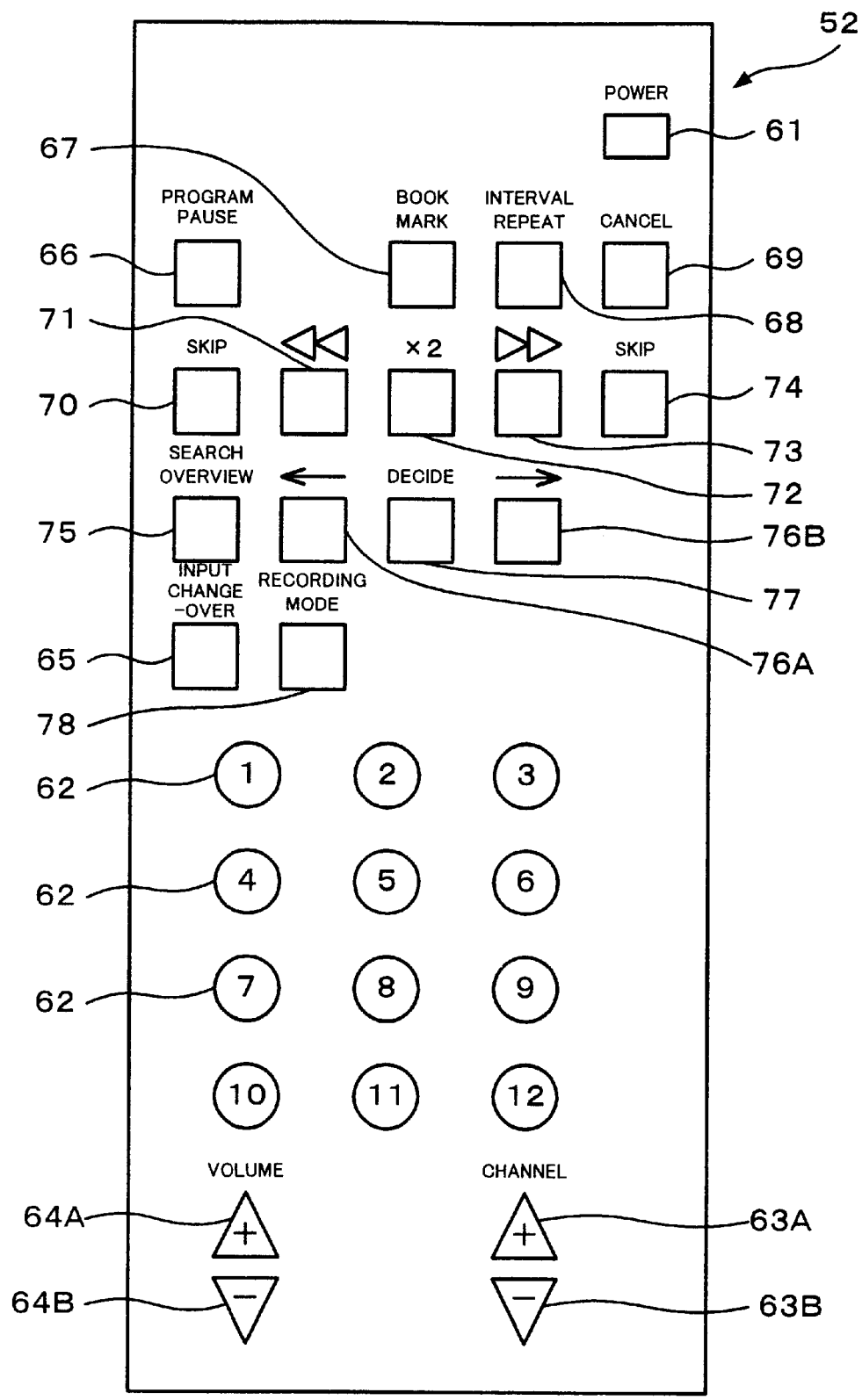
FIG. 2 is a plan view for use in explanation of a remote commander in the television receiver to which the invention is applied.

As shown in FIG. 2, the television receiver to which the invention is applied can be operated by using the remote commander 52.

Various keys to perform the fundamental setting of the television receiver are provided for the remote commander 52. That is, there are provided: a power switch 61 to turn on/off a power source of the television receiver; channel keys 62 to set a channel; channel up/down keys 63A and 63B; volume up/down keys 64A and 64B; and an input source change-over switch 65.

Further, as various keys to control the recording and reproduction of the hard disk drive 30 of the television receiver, the following keys are arranged on the remote commander 52 to operate the television receiver to which the invention is applied. That is, a program pause key 66, a book mark record key 67, an interval repeat key 68, a cancel key 69, a reverse rotation skip play key 70, a reverse rotation high speed feed key 71, a double speed key 72, a forward rotation high speed feed key 73, a forward rotation skip key 74, an overview search key 75, arrow keys 76A and 76B, and a decide key 77 are arranged. A recording mode key 78 is also arranged.

When the program pause key 66 is pressed, the picture plane which is being received is stopped in this moment and is displayed as a still image. For this period of time, the program is recorded into the hard disk drive 30 of the television receiver. When the program pause key 66 is again pressed, the program recorded in the hard disk drive 30 is reproduced from the scene at the timing corresponding to the still image.

When the book mark record key 67 is pressed, the program which is being broadcasted at this time can be preserved in the hard disk drive 30 of the television receiver.

A repeat play mode is set by the interval repeat key 68. When the interval repeat key 68 is first pressed, a start position of the repetition is set. When the interval repeat key 68 is subsequently pressed, an end position of the repetition is set.

The cancel key 69 is pressed to cancel the set operation or function.

The reverse rotation skip play key 70, reverse rotation high speed feed key 71, double speed key 72, forward rotation high speed key 73, and forward rotation skip key 74 are keys to perform the variable speed reproduction.

The overview search key 75, arrow keys 76A and 76B, and decide key 77 are used to search a desired program. When the overview search key 75 is pressed, the picture plane of the television receiver is divided into a center picture plane and a plurality of peripheral small picture planes. Among the picture planes recorded in the hard disk drive 30, the picture planes of every predetermined time are displayed in the small peripheral picture planes. When a desired one of a plurality of picture planes is selected and the reproduction start position is searched by the operations of the arrow keys 76A and 76B, the decide key 77 is pressed. When the decide key 77 is pressed, the reproduction is started from the selected picture plane.

The recording mode key 78 is used to set the standard recording mode or the long time recording mode. Besides the standard recording mode (SP mode), an LP mode in which the recording time is doubled and an EP mode in which the recording mode is tripled can be set by the recording mode key 78.

As mentioned above, the overview search key 75 is provided for the remote commander 52 of the television receiver to which the invention is applied. By using the overview search key 75, a desired reproduction start position can be easily searched from the information recorded in the hard disk drive 30.

Figure 3A:
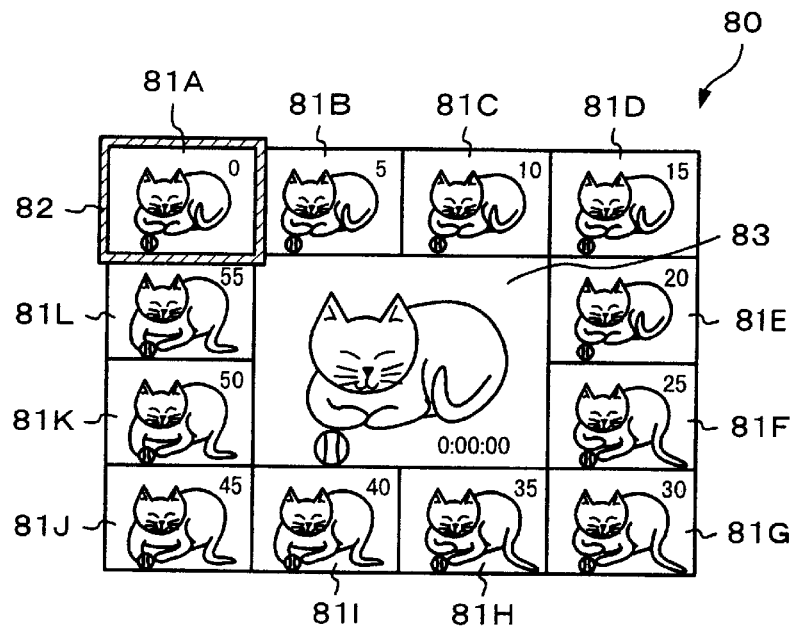
FIGS. 3A to 3C are schematic diagrams for use in explanation of index picture planes.

That is, now assuming that the recording time of the hard disk drive 30 is set to, for example, 60 minutes, by depressing the overview search key 75, the recording picture plane of 60 minutes is divided, for example, every 5 minutes and the picture planes of every 5 minutes are displayed as index images, That is, as shown in FIG. 3A, a picture plane 80 is divided into a plurality of small picture planes 81A, 81B, 81C, . . . . Now, assuming that the picture plane of the screen 81A is a picture plane of "0 minute", the picture planes of "5 min", "10 min", "15 min", . . . are displayed in the screens 81B, 81C, 81D, . . . . The time order of the picture planes 81A, 81B, 81C, . . . is set to be clockwise so that the user can easily recognize. The elapsed time is displayed by characters in each of the picture planes 81B, 81C, 81D, . . . . The moving image of the selected picture plane is displayed in a center small picture plane 83.

A desired target picture plane is selected from the picture planes 81A, 81B, 81C, . . . of every 5 minutes. The selection of the target picture plane is performed by the operations of the arrow keys 76A and 76B of the remote commander. Among the picture planes 81A to 81L, a picture plane frame 82 different from the other picture plane frames is displayed in the selected picture plane. At the same time, a moving image corresponding to the selected target picture plane is displayed in the center picture plane 83. The elapsed time is displayed in the moving image by characters. With which time zone of the index image the time zone when the picture plane is at present being reproduced is concerned can be visually known by making the colors of the picture plane frames coincident.

Figure 3B:
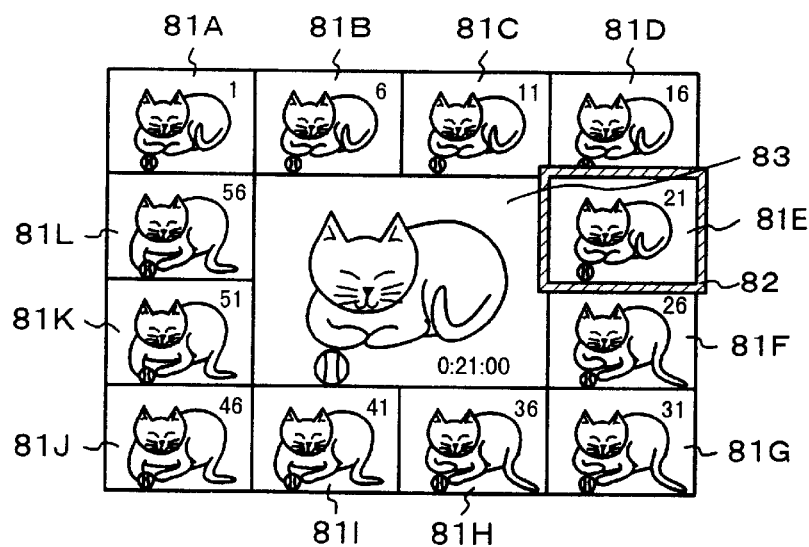

When the overview search key 75 is further pressed, as shown in FIG. 3B, each picture plane is offset by one minute at a time and the picture planes of "1 min", "6 min", "11 min", "16 min", . . . are displayed in the screens 81A, 81B, 81C, 81D, . . . . When the overview search key 75 is further pressed, each picture plane is further offset by one minute at a time. The picture planes of "2 min", "7 min", "12 min", and "17 min" are displayed in the screens 81A, 81B, 81C, 81D, . . . .

Figure 3C:
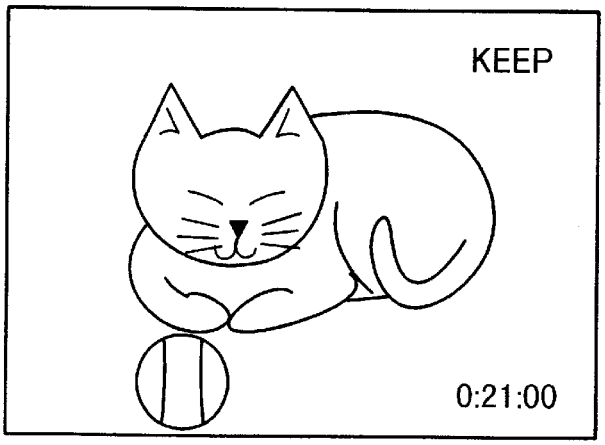

The user searches the time zone when he wants to start the reproduction of the moving image while seeing the index picture planes 81A, 81B, 81C, . . . . When the time zone when the user wants to start the reproduction of the moving image is searched, the decide key 77 is pressed. When the decide key 77 is pressed, as shown in FIG. 3C, a full screen display is performed and the reproduction of the moving image is started from the picture plane at the selected time.

According to the invention as mentioned above, with which time zone of the index image the time zone when the image is at present being reproduced is concerned can be visually known by making the colors of the picture plane frames coincident. The time order of the index picture planes which are displayed in the screens 81A, 81B, 81C, 81D, . . . is set to be clockwise in consideration of the actual life. The elapsed time is displayed by characters in each of the screens 81A, 81B, 81C, 81D, . . . of the indices. The detailed reproduction elapsed time is displayed by characters in the moving image of the center picture plane 83. Therefore, the user can easily recognize the time and can easily search.

As mentioned above, when the overview search key 75 is depressed, the recording picture plane of 60 minutes recorded in the hard disk drive 30 is divided, for example, every 5 minutes and is displayed in a plurality of screens 81A, 81B, 81C, 81D, . . . . When the overview search key 75 is further pressed, each picture plane is offset by one minute at a time. Therefore, the image serving as an index of the picture plane which the user desires to search is displayed in anywhere on the index screens 81A, 81B, 81C, 81D, . . . . A desired reproduction start position can be searched from such a picture plane.

Figure 4:
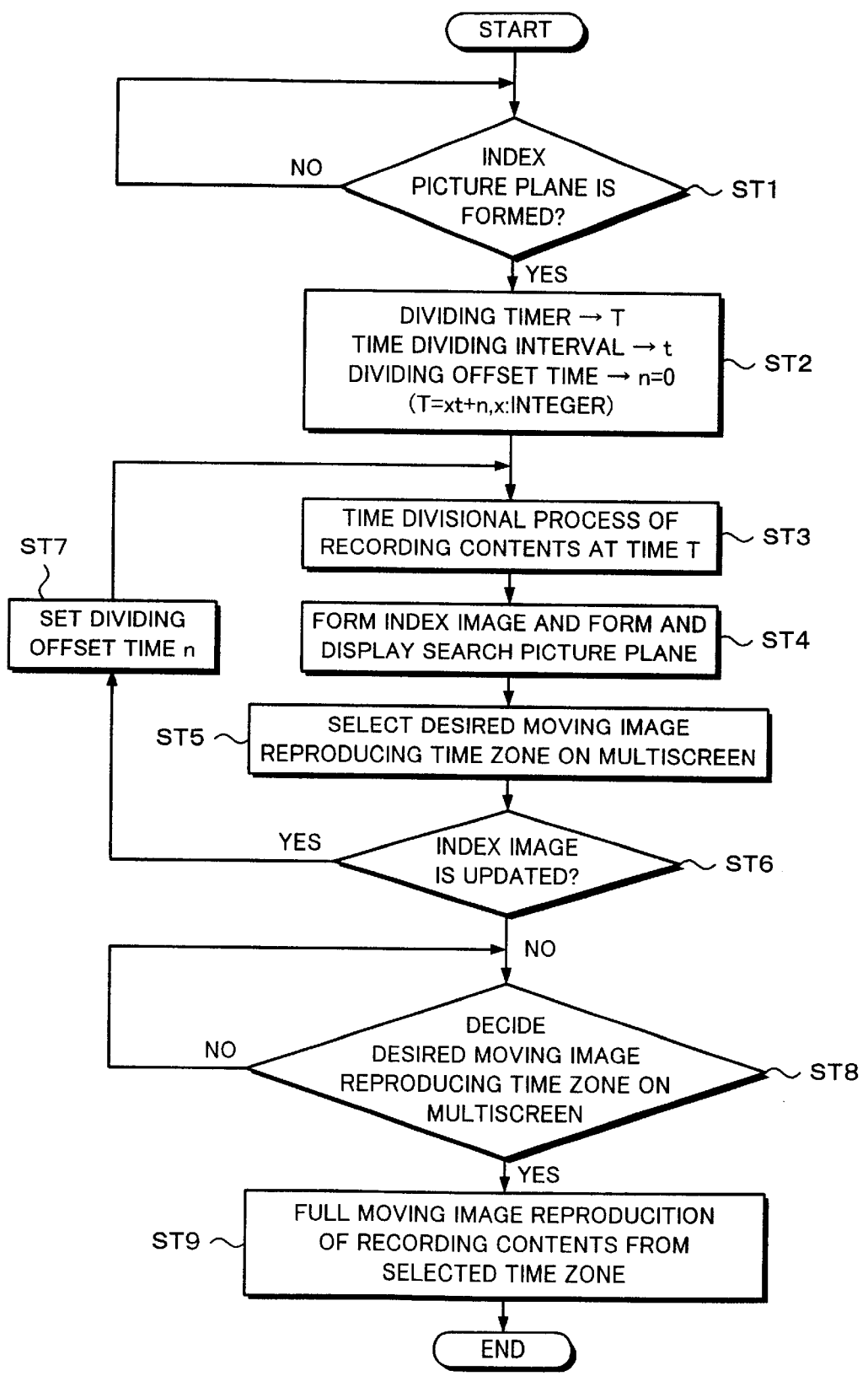
FIG. 4 is a flowchart for use in explanation of the index picture planes.

FIG. 4 is a flowchart showing processes for enabling a desired reproduction start position to be easily retrieved by divisionally displaying the image information preserved in the hard disk drive 30 every predetermined time.

In FIG. 4, whether an index picture plane as shown in FIGS. 3A to 3C is formed or not is discriminated by checking whether the overview search key 75 has been pressed or not (step ST1). In case of forming the index picture, a dividing time T, a dividing interval t, and offset time n (n=0) are set (step ST2).

The image information recorded in the hard disk drive 30 is divided at time T and every dividing interval t (step ST3). In the invention, the video data of one field has been compressed to a field of a fixed length and recorded in the hard disk drive 30. Therefore, there is a corresponding relation between the address in the hard disk drive 30 and the recording time. Consequently, the image information recorded in the hard disk drive 30 can be divided every predetermined time by a simple address arithmetic operation.

When the image information in the hard disk drive 30 is divided every predetermined time, the picture planes are accessed, the index images are formed from those divisional picture planes, and search picture planes are formed and displayed (step ST4). As shown in FIG. 3A, consequently, the images of every time are displayed as index picture planes onto the multiscreen.

A time zone when the user executes a desired moving image reproduction is selected on such a multiscreen (step ST5). Whether the index picture planes are updated or not is discriminated (step ST6).

In case of updating the index picture planes, the overview search key 75 is further pressed.

In case of updating the index picture planes, the divisional offset time n is set (step ST7). The processing routine is returned to step ST3. Thus, as shown in FIG. 3B, the index picture planes which are advanced by only the offset time n are displayed on the multiscreen.

When the index picture planes are not updated in step ST6, a check is made to see if the picture plane to start the moving image reproduction has been decided on the multi-screen (step ST8). When the time zone of the picture plane in which the user wants to perform the moving image reproduction is set, the decide key 77 is pressed. When the decide key 77 is pressed and the time zone when the user desires to start the moving image reproduction is determined, the video data in the decided time zone is read out from the hard disk drive 30 and the moving image is displayed on the full screen as shown in FIG. 3C (step ST9).

In the television receiver to which the invention is applied as mentioned above, the video data is compressed by the motion JPEG so that the data of one field is set to a fixed length. Therefore, the image information recorded in the hard disk drive 30 can be divided every predetermined time or the offset time can be given by the simple address arithmetic operations. Those arithmetic operations are executed by, for example, the system controller 10 and the hard disk drive 30 is accessed on the basis of the arithmetic operation results.

That is, in the television receiver to which the invention is applied, in case of compressing and recording the video data to the hard disk drive 30, the compressing process is executed by the image compressing circuit 23 so that the compression data of one field is equalized. Such a process is realized by a method whereby, for instance, the input video data is subsampled into ¼ field, the compression is tried a plurality of times to the video data of the same field, a code amount is presumed, and a quantization table is set so as to obtain a predetermined code amount.

Figure 5:
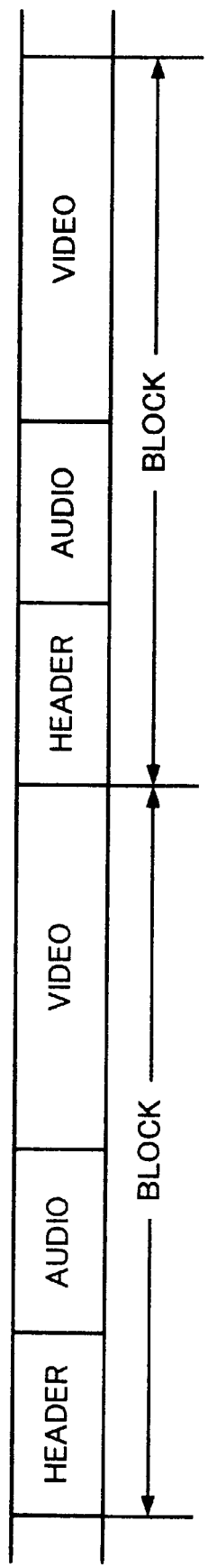
FIG. 5 is a schematic diagram for use in explanation of a data structure in the television receiver to which the invention is applied.

The video data of one field compressed so as to have the predetermined code amount is divided into blocks of a fixed length as shown in FIG. 5. As shown in FIG. 5, each block comprises the video data obtained by compressing one field by a fixed length and the audio data. A predetermined header to identify the block is provided at the head of each block. As mentioned above, the data is recorded in the hard disk drive 30 while using the blocks of the fixed length as files.

As described above, since the image of each field is recorded as a file of a fixed length into the hard disk drive 30, the access address in the hard disk drive 30 of the index image at a certain time T can be obtained by a simple arithmetic operation by converting the elapsed time from the recording start time to the number of fields. That is, a logic address on the hard disk (HDD) can be obtained as follows by the start address of the hard disk, the number of fields converted from the elapsed time, and the number of sectors of the block fixed length.

(logic address on the HDD)=(start address of the HDD)+ (the number of fields)×(block fixed sector length)

Since the conversion of the number of fields can be specified by how many seconds of the real time the one recorded field corresponds to, it can be easily calculated. For example, in case of performing the subsampling of ¼ field and reproducing, the image data of one field corresponds to about 0.25 second.

As mentioned above, in the television receiver to which the invention is applied, when the overview search key 75 is pressed, the recording picture plane of 60 minutes is divided, for example, every 5 minutes and the divided picture planes are displayed onto a plurality of screens 81A, 81B, 81C, 81D, ... of every 5 minutes. When the overview search key 75 is further depressed, each picture plane is offset by one minute at a time. Therefore, the image as an index of the picture plane which the user wants to search is displayed on any one of the index screens 81A, 81B, 81C, 81D, ... and the desired recording position can be searched from the picture plane. Since the video data in which one field was compressed to a fixed length is recorded in the hard disk drive 30, the reproduction picture plane of each time zone can be displayed by the simple address arithmetic operation.

In the embodiment, although the video data based on the received picture plane has been preserved in the hard disk drive, the invention can be also similarly applied to a case of preserving the video data into another recording medium, for example, a semiconductor memory on the basis of the received picture plane.

Another embodiment of the invention will now be described.

In a television receiver to which the embodiment can be applied, the recording mode key 78 is arranged on the remote commander 52 and the normal mode, LP mode, and EP mode can be set. In the LP mode, the recording time that is twice as long as that in the standard mode can be obtained. In the EP mode, the recording time that is three times as long as that in the standard mode can be obtained.

The setting of the LP mode or EP mode is performed by, for instance, changing a compression ratio of the video signal.

That is, the image compressing circuit 23 can change a compression ratio by changing, for instance, a quantization table. For example, when the recording mode is set to the LP mode, the compression ratio is set to, for example, a value which is twice as large as that in the standard mode. When the recording mode is further set to the EP mode, the compression ratio is set to a value which is three times as large as that in the standard mode.

Figure 6A:
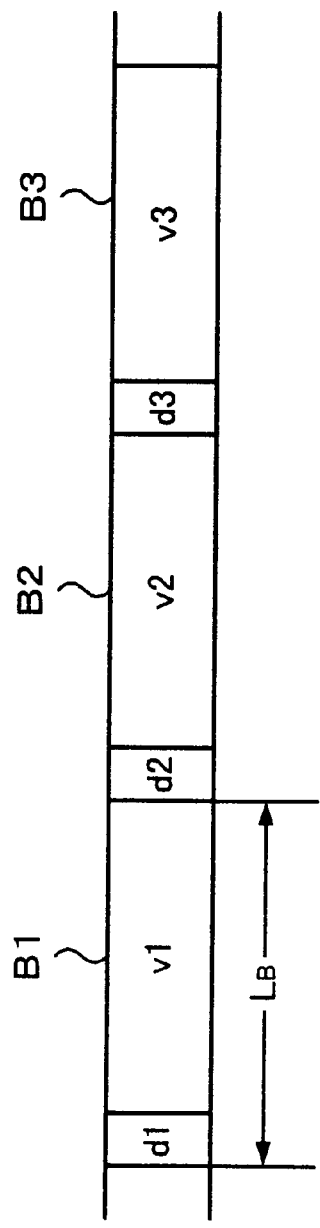
FIGS. 6A to 6C are schematic diagrams for use in explanation of an example of the long time recording in the television receiver to which the invention is applied.

For example, in case of the normal mode, as shown in FIG. 6A, the video data of one field is arranged in one block. The header is provided at the head of each block. That is, the video data of a field v1 and a header d1 are arranged in a block B1. The video data of a field v2 and a header v2 are arranged in a block B2. The video data of a field v3 and a header d3 are arranged in a block B3. Although the video data is arranged in the block on the diagram, the video data can also include audio data as shown in FIG. 5.

Figure 6B:
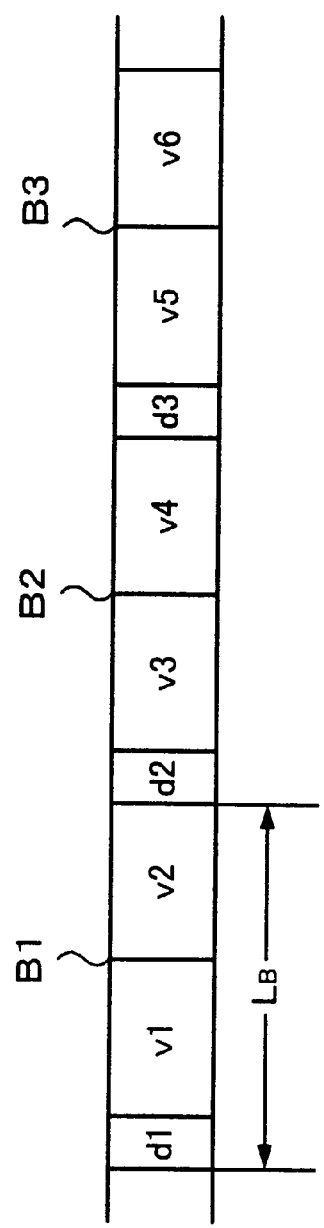

In case of the LP mode, as shown in FIG. 6B, the data of two fields are arranged in one block and the header is provided at the head of each block. That is, the video data of the fields v1 and v2 and the header d1 are arranged in the block B. The video data of the fields v3 and v4 and the header d2 are arranged in the block B2. The video data of fields v5 and v6 and the header d3 are arranged in the block B3. Mode information showing the LP mode is included in each of the headers d1, d2, d3, .... The compression ratio information can be also used as mode information.

Figure 6C:
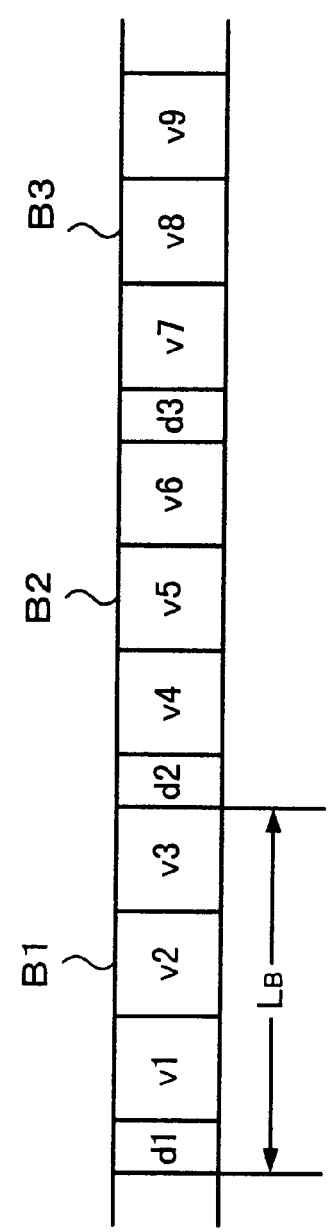

In case of the EP mode, as shown in FIG. 6C, the data of three fields is arranged in one block and the header is provided at the head of each block. That is, the video data of the fields v1, v2, and v3 and the header d1 are arranged in the block B1. The video data of the fields v4, v5, and v6 and the header d2 are arranged in the block B2. The video data of the fields v7, v8, and v9 and the header d3 are arranged in the block B3. Mode information showing the EP mode is included in each of the headers d1, d2, d3, . . . . The compression ratio information can be also used as mode information.

In case of the LP mode, the data of two fields is arranged in one block and, in case of the EP mode, the data of three fields is arranged in one block as mentioned above. However, in the LP mode, the compression ratio is set to a value that is twice as large as that in the standard mode and, in the EP mode, the compression ratio is set to a value which is three times as large as that in the standard mode. Therefore, a size $L_B$ of block in each mode is the same. Therefore, the recording process of the data to the hard disk drive 30 can be similarly performed.

Figure 7A:
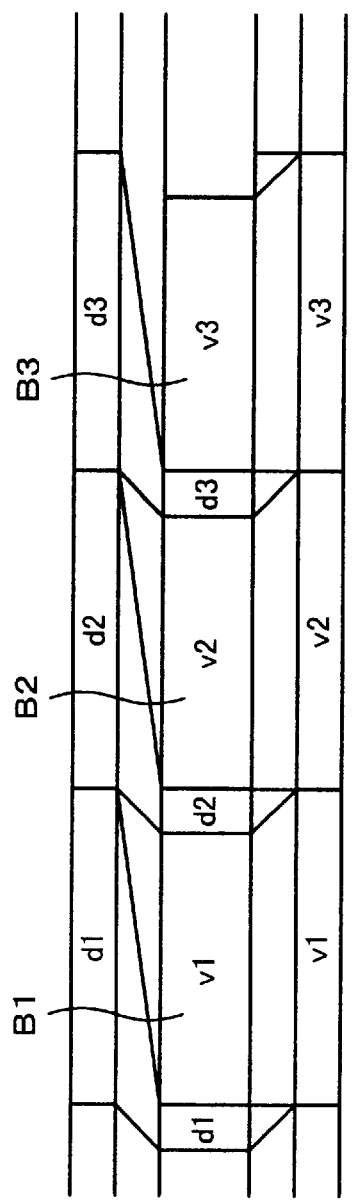
FIGS. 7A to 7C are schematic diagrams for use in explanation of an example of the long time recording in the television receiver to which the invention is applied.

Upon reproduction, the mode information is derived from the information of the header. In accordance with the mode information, whether the recording mode is the normal mode, LP mode, or EP mode can be discriminated. In case of the standard mode, as shown in FIG. 7A, information showing the standard mode is obtained from the headers d1, d2, d3 . . . . In this case, the video data of one field is decompressed from the data of one block. That is, as shown in FIG. 7A, the data of the field v1 is decompressed from the data of the block B1, the data of the field v2 is decompressed from the data of the block B2, and the data of the field v3 is decompressed from the data of the block B3.

Figure 7B:
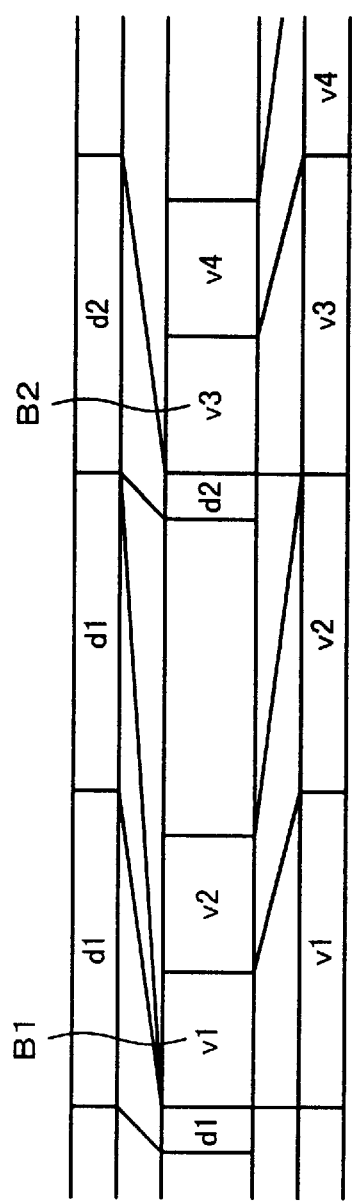

In case of the LP mode, as shown in FIG. 7B, information showing the LP mode is derived from the headers d1, d2, d3, . . . . In this case, the video data of two fields is decompressed from the data of one block. That is, as shown in FIG. 7B, the data of the fields v1 and v2 is decompressed from the data of the block B1. The data of the fields v3 and v4 is decompressed from the data of the block B2. The data of the fields v5 and v6 is decompressed from the data of the block B3.

Figure 7C:
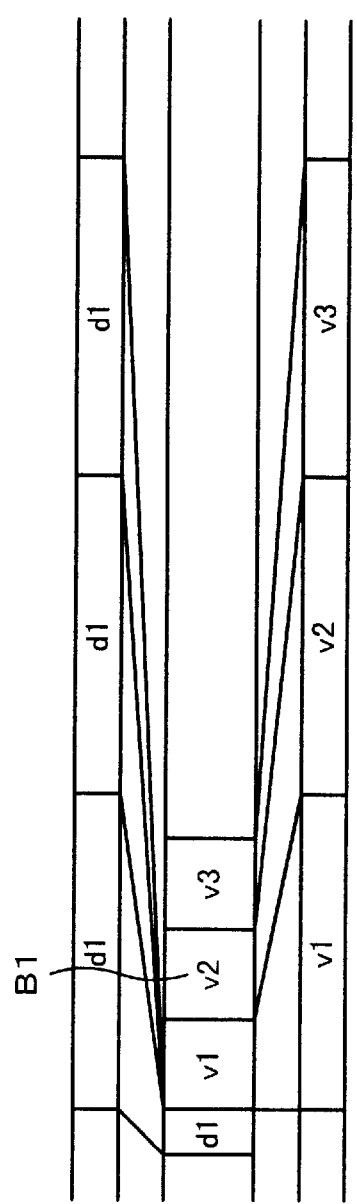

In case of the EP mode, as shown in FIG. 7C, information showing the EP mode is derived from the headers d1, d2, d3, . . . . In this case, the video data of three fields is decompressed from the data of one block. That is, as shown in FIG. 7C, the data of the fields v1, v2, and v3 is decompressed from the data of the block B1. The data of the fields v4, v5, and v6 is decompressed from the data of the block B2. The data of the fields v7, v8, and v9 is decompressed from the data of the block B3.

In the above example, by varying the compression ratio, the recording mode is set to the long time mode. However, the long time recording can be also performed by subsampling.

That is, by controlling the reading operation from the field memory 22, the subsampling can be performed. For example, when the recording mode is set to the LP mode, the subsampling of one field is performed to two fields. For instance, when the recording mode is set to the EP mode, the subsampling of one field is executed to three fields.

Figure 8A:
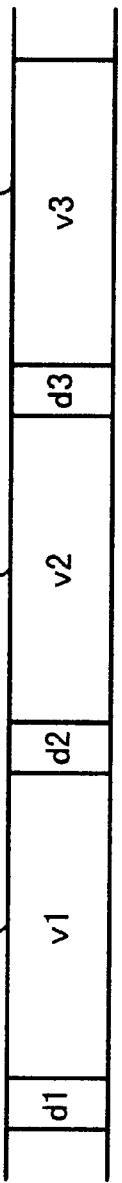
FIGS. 8A to 8C are schematic diagrams for use in explanation of another example of the long time recording in the television receiver to which the invention is applied.

As shown in FIG. 8A, for instance, in case of the normal mode, the video data of one field is arranged in one block and the data of each field is sequentially arranged in each block. The video data of the field v1 and the header d1 are arranged in the block B1. The video data of the field v2 and the header d2 are arranged in the block B2. The video data of the field v3 and the header d3 are arranged in the block B3.

Figure 8B:
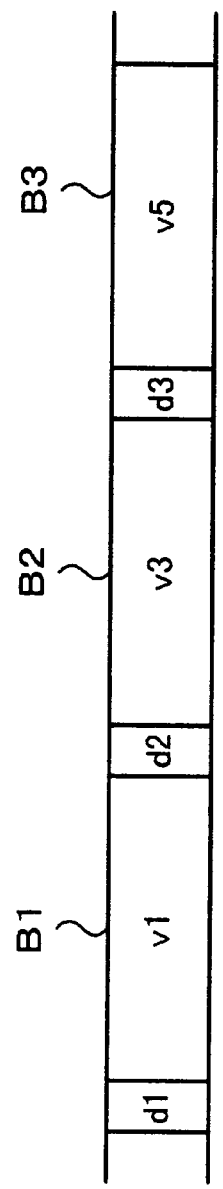

In case of the LP mode, as shown in FIG. 8B, the subsampling of one field is performed to two fields. The video data of the field v1 and the header d1 are arranged in the block B1. The video data of the field v3 and the header d2 are arranged in the block B2. The video data of the field v5 and the header d3 are arranged in the block B3. The mode information showing the LP mode is included in each of the headers d1, d2, d3, . . . .

Figure 8C:
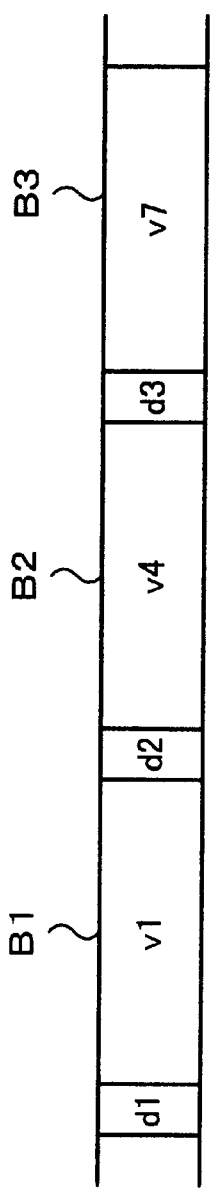

In case of the EP mode, as shown in FIG. 8C, the subsampling of one field is performed to three fields. The video data of the field v1 and the header d1 are arranged in the block B1. The video data of the field v4 and the header d2 are arranged in the block B2. The video data of the field v7 and the header d3 are arranged in the block B3. The mode information showing the EP mode is included in each of the headers d1, d2, d3, . . . .

Figure 9A:
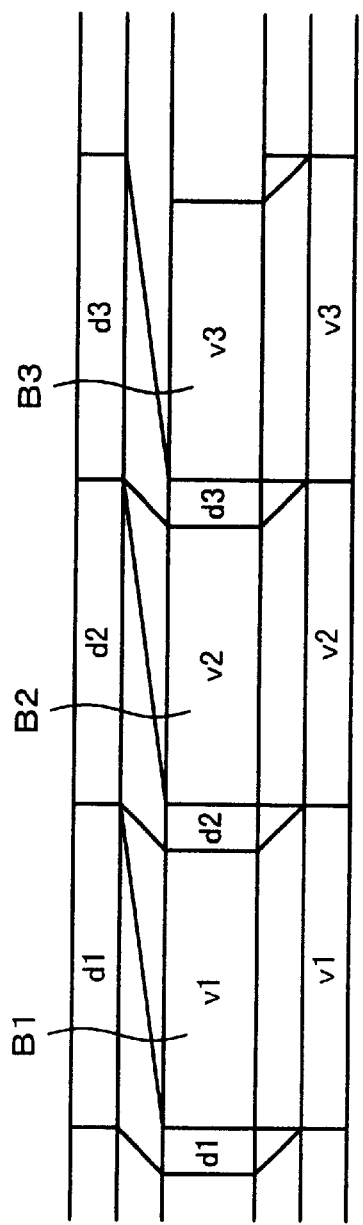
FIGS. 9A to 9C are schematic diagrams for use in explanation of still another example of the long time recording in the television receiver to which the invention is applied.

Upon reproduction, the mode information is obtained from the information of the header. Whether the recording mode is the normal mode, LP mode, or EP mode is discriminated in accordance with the mode information. In case of the standard mode, as shown in FIG. 9A, the information showing the standard mode is derived from the headers d1, d2, d3, . . . . As shown in FIG. 9A, the data of the field v1 is decompressed from the data of the block B1. The data of the field v2 is decompressed from the data of the block B2. The data of the field v3 is decompressed from the data of the block B3.

Figure 9B:
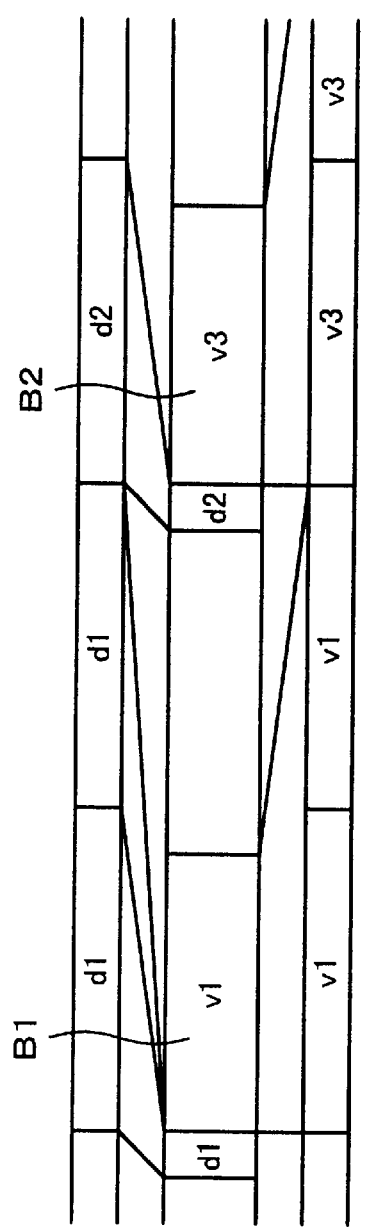

In case of the LP mode, as shown in FIG. 9B, the information indicative of the LP mode is derived from the headers d1, d2, d3 . . . . In case of the LP mode, as shown in FIG. 9B, the data of the field v1 is decompressed from the data of the block B1. The data of the field v1 is reproduced over two fields. The data of the field v3 is decompressed from the data of the block B2. The data of the field v3 is reproduced over two fields.

Figure 9C:
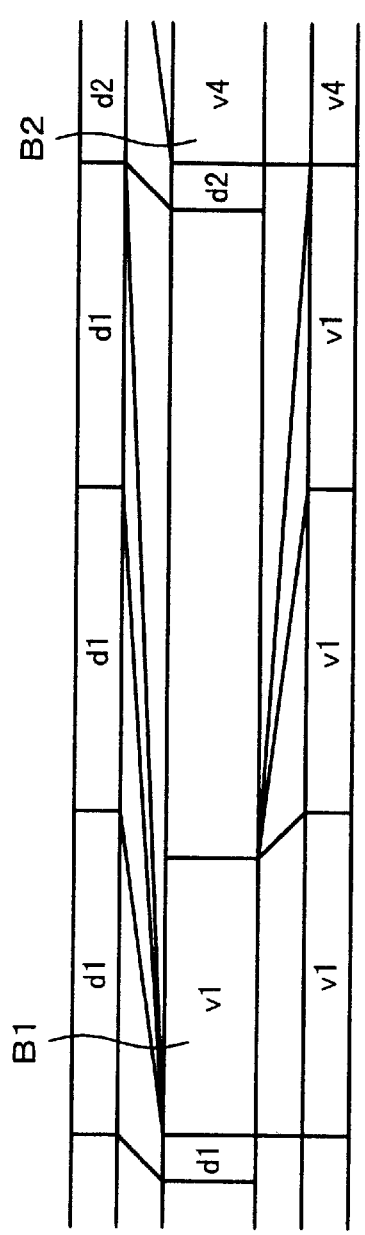

In case of the EP mode, as shown in FIG. 9C, the information indicative of the EP mode is derived from the headers d1, d2, d3, In case of the EP mode, as shown in FIG. 9C, the data of the field v1 is decompressed from the data of the block B1. The data of the field v1 is reproduced over three fields. The data of the field v4 is decompressed from the data of the block B2. The data of the field v4 is reproduced over three fields.

In the above example, although the LP mode of the double recording time and the EP mode of the triple recording time have been described, the other recording time can be also similarly set. The recording time can be also set in combination of the compression ratio and the subsampling.

According to the embodiment of the invention, when the overview search key is pressed, the display picture plane is divided into a plurality of small picture planes. The video data recorded in the hard disk drive of every predetermined time is divisionally displayed in each divided picture plane. When the overview search key is further depressed, each picture plane is offset every predetermined time. Therefore, the image as an index of the picture plane which the user wants to search is displayed on any one of the index picture planes. A desired recording position can be easily searched from such a picture plane.

According to the other embodiment of the invention, when the video signal is compressed and recorded onto the recording medium, by changing the compression ratio, the long time recording mode can be easily set. By dividing the video signal into blocks of a fixed length and by providing the header including the information regarding the recording mode into the blocks, the recording and reproducing processes can be executed in a manner similar to the normal recording mode. The compression ratio can be easily set to a value according to the recording mode upon reproduction. Even when the recording mode is changed during the operation, a disturbance of the picture plane does not occur.

When the video signal is recorded onto the recording medium, by changing the subsampling interval, the long time recording mode can be easily set. By dividing the video signal into the blocks of a fixed length and by providing the header including the information regarding the recording mode into the blocks, the recording and reproducing processes can be executed in a manner similar to the normal recording mode. The interpolating process according to the recording mode can be easily performed upon reproduction. Even when the recording mode is changed during the operation, a disturbance of the picture plane does not occur.

The present invention is not limited to the foregoing embodiments but many modifications and variations are possible within the spirit and scope of the appended claims of the invention.

What is claimed is:

1. A video apparatus for use with a signal receiver, said video apparatus comprising:

display means for displaying moving image information of a signal received by said receiver;

recording means for recording the received signal in predetermined units each having a fixed data length on a random-access recording medium;

time-divisional means for dividing the recorded signal into segments each having a predetermined time interval, said segments each including one or more of said predetermined units;

picture plane division display means for dividing a picture plane area of said display means into a plurality of small picture plane areas and displaying in each of the plurality of small picture plane areas an index image representing a respective one of said segments;

input means for designating one of said index images; and means for retrieving the segment corresponding to said designated index image based upon an elapsed time and a number of said predetermined units from said recording medium, wherein said display means displays image information of the retrieved segment.

2. An apparatus according to claim 1, further comprising offset means for applying an offset time of a predetermined amount to each of the segments.

3. An apparatus according to claim 1, wherein said display means comprises an image display surface, and said picture plane division display means arranges said plurality of small picture plane areas to a peripheral portion of said image display surface.

4. An apparatus according to claim 3, wherein said picture plane division display means further arranges a large picture plane area having an area larger than that of each of said plurality of small picture plane areas to a center portion of said image display surface.

5. An apparatus according to claim 4, wherein the image information of the retrieved segment is displayed in the large picture plane area.

6. An apparatus according to claim 3, wherein said picture plane division display means time-sequentially arranges said plurality of small picture plane areas in a clockwise direction into the peripheral portion of said display means.

7. An apparatus according to claim 3, wherein said picture plane division display means further displays time information corresponding to each of said index images in each of said plurality of small picture plane areas.

8. An apparatus according to claim 1, wherein said recording medium is a disk-shaped recording medium.

9. An apparatus according to claim 8, wherein said disk-shaped recording medium is a hard disk.

10. An apparatus according to claim 1, wherein said display means displays moving images from the image information of the retrieved segment.

11. An apparatus according to claim 1, wherein said signal receiver selectively receives a television broadcast signal.

12. An apparatus according to claim 1, further comprising means for inputting additional information, wherein inputted additional information is recorded onto said recording medium.

13. A display method for use with a signal receiver, comprising the steps of:

displaying moving image information of a signal received by said receiver on a display area;

recording the received signal in predetermined units each having a fixed data length on a random-access recording medium;

dividing the recorded signal into segments each having a predetermined time interval, said segments each including one or more of said predetermined units;

dividing a picture plane area of said display area into a plurality of small picture plane areas and displaying in each of the plurality of small picture plane areas an index image representing a respective one of said segments;

designating one of said index images;

retrieving the segment corresponding to said designated index image based upon an elapsed time and a number of said predetermined units from said recording medium; and displaying image information of the retrieved segment.

14. A method according to claim 13, further comprising an offset step of providing an offset time of a predetermined amount to each of the segments.

* * * * *